(12) United States Patent
Zeng et al.

(10) Patent No.: US 11,965,827 B2
(45) Date of Patent: Apr. 23, 2024

(54) HYPERSPECTRAL IMAGING METHOD AND APPARATUS

(71) Applicants: Chongqing Institute of East China Normal University, Chongqing (CN); East China Normal University, Shanghai (CN); Yunnan Huapu Quantum Material Co., Ltd, Yunnan (CN); ROI Optoelectronics Technology CO, LTD., Shanghai (CN); Chongqing Huapu New Energy Co., Ltd., Chongqing (CN); Chongqing Huapu Information Technology Co., Ltd., Chongqing (CN); Nanjing ROI Optoelectronics Technology Co., Ltd., Jiangsu (CN)

(72) Inventors: Heping Zeng, Chongqing (CN); Jianan Fang, Chongqing (CN); Kun Huang, Chongqing (CN); Mengyun Hu, Chongqing (CN)

(73) Assignees: CHONGQING INSTITUTE OF EAST CHINA NORMAL UNIVERSITY, Chongqing (CN); EAST CHINA NORMAL UNIVERSITY, Shanghai (CN); YUNNAN HUAPU QUANTUM MATERIAL CO., LTD, Kunming (CN); ROI OPTOELECTRONICS TECHNOLOGY CO, LTD., Shanghai (CN); CHONGQING HUAPU NEW ENERGY CO., LTD., Chongqing (CN); CHONGQING HUAPU INFORMATION TECHNOLOGY CO., LTD., Chongqing (CN); NANJING ROI OPTOELECTRONICS TECHNOLOGY CO., LTD., Jiangsu (CN)

( * ) Notice: Subject to any disclaimer, the term of this patent is extended or adjusted under 35 U.S.C. 154(b) by 86 days.

(21) Appl. No.: 17/936,161

(22) Filed: Sep. 28, 2022

(65) Prior Publication Data
US 2023/0099128 A1     Mar. 30, 2023

(30) Foreign Application Priority Data

Sep. 29, 2021    (CN) .......................... 202111150593.6

(51) Int. Cl.
*G01N 21/35*         (2014.01)

(52) U.S. Cl.
CPC ... *G01N 21/35* (2013.01); *G01N 2201/06113* (2013.01); *G01N 2201/0633* (2013.01)

(58) Field of Classification Search
CPC .................................................... G01N 21/35
See application file for complete search history.

(56) References Cited

U.S. PATENT DOCUMENTS

2020/0110326 A1*   4/2020   Suchowski ........... G02F 1/3526
2022/0413143 A1*   12/2022   Parsa ...................... G01S 17/86

FOREIGN PATENT DOCUMENTS

| CN | 110823388 A | 2/2020 |
|----|-------------|--------|
| CN | 113176583 A | 7/2021 |

OTHER PUBLICATIONS

Akira Kawai et al. Time-stretch infrared spectroscopy, Department of Physics, the University of Tokyo, Tokyo, Japan Institute for Photon Science and Technology, the University of Tokyo, Tokyo, Japan, PRESTO, Japan Science and Technology Agency, Saitama, Japan, https: arxiv.org/abs/1912.03857 (Year: 2020).*

(Continued)

*Primary Examiner* — Hugh Maupin
(74) *Attorney, Agent, or Firm* — Hodgson Russ LLP (57) ABSTRACT

A hyperspectral imaging method includes: providing time-domain synchronous mid-infrared ultrashort pulse and near-infrared ultrashort pulse as pump light and signal light, respectively; subjecting the signal light to optical time-stretching to broaden a pulse width of the signal light; directing the time-stretched signal light to a target sample to be detected; directing the pump light to a time delayer to adjust the time when the pump light reaches a silicon-based camera; spatially combining the time-stretched signal light from the target sample with the pump light from the time delayer; directing combined light to a silicon-based camera where the signal light is detected through non-degenerate two-photon absorption of the signal light under the action of (Continued)

the pump light to acquire hyperspectral imaging data; and obtaining an image of the target sample based on the hyperspectral imaging data.

20 Claims, 3 Drawing Sheets

(56) References Cited

OTHER PUBLICATIONS

CNIPA, First Office Action for CN Application No. 202111150593. 6, dated Oct. 10, 2023.

* cited by examiner

HYPERSPECTRAL IMAGING METHOD AND APPARATUS

CROSS-REFERENCE TO RELATED APPLICATION

This application claims priority to and benefits of Chinese Patent Application No. 202111150593.6, filed on Sep. 29, 2021, the entire disclosure of which is incorporated herein by reference.

FIELD

The present disclosure relates to the field of infrared spectrum detection and imaging technology, and more particularly to a high-resolution and ultrasensitive time-stretched infrared hyperspectral imaging method and apparatus.

BACKGROUND

Hyperspectral imaging is a multi-dimensional information acquisition method that combines imaging technology with spectral technology. The obtained hyperspectral data cube contains both image contour information and fine spectral information of a target object, which can be used to realize "fingerprint" recognition of the target object. In particular, the infrared band has a wide spectral domain, which is within fingerprint spectral regions of molecules, contains characteristic spectral lines of vibrational-rotational energy level transition of many important molecules, and has a strong ability to penetrate dust and fog. Therefore, the development of high-performance infrared hyperspectral imaging technology has always been an international research hotspot.

However, existing infrared hyperspectral imaging is limited by certain technologies (e.g., spectral dispersion and split) and devices (e.g., infrared focal plane array detectors), and it is urgent to improve the acquisition sensitivity and spectral resolution of infrared spectra.

SUMMARY

Embodiments of the present disclosure seek to solve at least one of the problems existing in the related art to at least some extent.

According to a first aspect of the present disclosure, a hyperspectral imaging method is provided. The hyperspectral imaging method includes: providing a mid-infrared ultrashort pulse as pump light and a near-infrared ultrashort pulse as signal light, the mid-infrared ultrashort pulse and the near-infrared ultrashort pulse being synchronous precisely in time domain; subjecting the signal light to optical time-stretching to broaden a pulse width of the signal light and separate light components of different wavelengths in the signal light in the time domain; directing the time-stretched signal light to a target sample to be detected; directing the pump light to a time delayer to adjust the time when the pump light reaches a silicon-based camera; spatially combining the time-stretched signal light from the target sample with the pump light from the time delayer; directing the combined light to a silicon-based camera where the signal light is detected through non-degenerate two-photon absorption of the signal light under the action of the pump light to acquire hyperspectral imaging data; and obtaining an image of the target sample based on the hyperspectral imaging data.

According to a second aspect of the present disclosure, a hyperspectral imaging apparatus is provided. The hyperspectral imaging apparatus includes: a light source assembly, configured to provide a mid-infrared ultrashort pulse as pump light and a near-infrared ultrashort pulse as signal light, the mid-infrared ultrashort pulse and the near-infrared ultrashort pulse being synchronous precisely in time domain; a time-stretching component, configured to subject the signal light to optical time-stretching to broaden a pulse width of the signal light and separate light components of different wavelengths in the signal light in the time domain; a light absorption component, including a target sample, and configured to receive the time-stretched signal light and absorb a light component with a certain wavelength of the time-stretched signal light by the target sample; a time delayer, configured to receive the pump light and adjust the time when the pump light reaches a silicon-based camera; a first dichroscope, configured to spatially combine the signal light from the light absorption component and the pump light from the time delayer in such a way that a light spot formed by the pump light wraps a light spot formed by the signal light; a silicon-based camera, configured to receive the combined light, detect the signal light through non-degenerate two-photon absorption of the signal light thereon under the action of the pump light, and acquire hyperspectral imaging data; a controlling and acquiring component, connected with the time delayer and the silicon-based camera, and configured to control the time delayer to adjust the time when the pump light reaches the silicon-based camera, receive the hyperspectral imaging data from the silicon-based camera, and acquiring an image of the target sample.

According to a third aspect of the present disclosure, there is provided a hyperspectral imaging device. The hyperspectral imaging device includes a processor; and a memory for storing instructions executable by the processor. The processor is configured to perform the hyperspectral imaging method as described in the first aspect of the present disclosure.

According to a fourth aspect of the present disclosure, there is provided a non-transitory computer-readable storage medium having stored therein instructions that, when executed by a processor of a terminal, causes the terminal to perform the hyperspectral imaging method as described in the first aspect of the present disclosure.

It should be appreciated that, the general description hereinbefore and the detail description hereinafter are explanatory and illustrative, and shall not be construed to limit the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Hyperspectral imaging is a multi-dimensional information acquisition method that combines imaging technology with spectral technology. The obtained hyperspectral data cube contains both image contour information and fine spectral information of a target object, which can be used to realize the "fingerprint" recognition of the target object. In particular, the infrared band has a wide spectral domain, which is within fingerprint spectral regions of molecules, contains characteristic spectral lines of vibrational-rotational energy level transition of many important molecules, and has a strong ability to penetrate dust and fog. The hyperspectral imaging not only promotes the development of basic disciplines such as molecular spectroscopy and space astronomy, but also has important applications in remote sensing, medical diagnosis, chip detection and other fields. Therefore, the development of high-performance infrared hyperspectral imaging technology has always been an international research hotspot.

However, the spectral resolution at nanometer level and the detection sensitivity at microwatt level greatly limit the application of the hyperspectral imaging technology in fast and non-contact infrared spectral imaging and detecting fields. For example, grating or prism spectrophotometry needs to cooperate with a scanning device to complete two-dimensional spatial imaging, which greatly limits the imaging update rate, and the spectral resolution is also restricted due to the influence of a spatial distance of a spectroscopic device. As another example, chip coating spectrophotometry realizes hyperspectral imaging by coating filter films for different wavebands on detector pixels. Although this method has a high imaging frame frequency, its spectral resolution is low, usually greater than 10 nm. As another example, FTIR imaging technology can obtain a higher spectral resolution by scanning long-range interference arms, but it often comes at the expense of spectral imaging speed. In addition, infrared detectors for the infrared hyperspectral imaging usually use semiconductor materials (such as mercury cadmium telluride, indium antimonide) with narrower band gaps, which however have large intrinsic dark noise and usually require complex and expensive cryogenic refrigeration devices, and are far inferior to silicon-based devices for the visible light band in terms of the number of pixels, pixel size, working frame frequency and other core performance indicators, resulting in the spatial resolution, imaging sensitivity, field of view, and imaging speed of infrared imaging being greatly limited.

For this, the present disclosure proposes a hyperspectral imaging technology with both high resolution and high sensitivity, which uses non-degenerate two-photon absorption infrared detection technology to realize the response of a silicon-based imaging device to the infrared band, and in combination with a nonlinear optical sampling technology to break through the limitations of traditional light splitting devices. This high-performance imaging spectroscopy provided by the present disclosure can provide technical supports for histopathological diagnosis, trace analysis, non-destructive testing and the like.

Further, thanks to the mature silicon photonic integration technology, existing silicon-based charge-coupled devices (CCDs) have extremely high sensitivity, which even reaches a single-photon response level. However, due to the limitation of response wavebands of semiconductor materials, the silicon-based CCD cannot directly respond to the infrared band.

In view of this, the present disclosure provides an infrared hyperspectral imaging method and apparatus, which adopts a non-degenerate two-photon absorption technology of long-wave pump light pulses. In this technology, an infrared signal light pulse and a long-wave pump light pulse are incident on a photosensitive surface of a silicon-based CCD at the same time to realize sensitive detection on the infrared band. The imaging method and apparatus according to embodiments of the present disclosure make full use of the characteristics of high spatial resolution, high detection sensitivity, fast response speed, large field of view, and mature commercialization of the silicon-based CCD.

According to a first aspect of the present disclosure, a hyperspectral imaging method is provided. The hyperspectral imaging method includes: providing a mid-infrared ultrashort pulse as pump light and a near-infrared ultrashort pulse as signal light, the mid-infrared ultrashort pulse and the near-infrared ultrashort pulse being synchronous precisely in time domain; subjecting the signal light to optical time-stretching to broaden a pulse width of the signal light and separate light components of different wavelengths in the signal light in the time domain; directing the time-stretched signal light to a target sample to be detected; directing the pump light to a time delayer to adjust the time when the pump light reaches a silicon-based camera; spatially combining the time-stretched signal light from the target sample with the pump light from the time delayer; directing the combined light to a silicon-based camera where the signal light is detected through non-degenerate two-photon absorption of the signal light under the action of the pump light to acquire hyperspectral imaging data; and obtaining an image of the target sample based on the hyperspectral imaging data.

In some embodiments, subjecting the signal light to optical time-stretching includes: passing the signal light through a dispersive medium to separate light components of different wavelengths in the signal light in the time domain.

In some embodiments, the dispersive medium is selected from a single-mode dispersive fiber, a multi-mode fiber, and a chirped fiber Bragg grating.

In some embodiments, the pump light and the signal light are provided by a laser through nonlinear spontaneous parametric down-conversion.

In some embodiments, wherein the laser is a high-power femtosecond laser.

In some embodiments, providing the mid-infrared ultrashort pulse as the pump light and the near-infrared ultrashort pulse as the signal light includes: separating a laser beam generated by a laser to the mid-infrared ultrashort pulse and the near-infrared ultrashort pulse through a chirped periodically poled lithium niobate crystal; collimating the mid-infrared ultrashort pulse and the near-infrared ultrashort pulse by a collimator, and spatially separating the mid-infrared ultrashort pulse from the near-infrared ultrashort pulse by a dichroscope to provide the pump light and the signal light.

In some embodiments, the collimator is a $CaF_2$ convex lens.

In some embodiments, a photon energy corresponding to the signal light is lower than a band gap energy of a silicon material, a photon energy corresponding to the pump light is lower than a half of the band gap energy of the silicon material, and a sum of the photon energy corresponding to the signal light and the photon energy corresponding to the pump light is greater than the band gap energy.

In some embodiments, the silicon-based camera is a silicon-based charge-coupled device.

In some embodiments, the silicon-based charge-coupled device is an electron multiplying charge-coupled device or an intensified charge-coupled device.

According to a second aspect of the present disclosure, a hyperspectral imaging apparatus is provided. The hyperspectral imaging apparatus includes: a light source assembly, configured to provide a mid-infrared ultrashort pulse as pump light and a near-infrared ultrashort pulse as signal light, the mid-infrared ultrashort pulse and the near-infrared ultrashort pulse being synchronous precisely in time domain; a time-stretching component, configured to subject the signal light to optical time-stretching to broaden a pulse width of the signal light and separate light components of different wavelengths in the signal light in the time domain; a light absorption component, including a target sample, and configured to receive the time-stretched signal light and absorb a light component with a certain wavelength of the time-stretched signal light by the target sample; a time delayer, configured to receive the pump light and adjust the time when the pump light reaches a silicon-based camera; a first dichroscope, configured to spatially combine the signal light from the light absorption component and the pump light from the time delayer in such a way that a light spot formed by the pump light wraps a light spot formed by the signal light; a silicon-based camera, configured to receive the combined light, detect the signal light through non-degenerate two-photon absorption of the signal light thereon under the action of the pump light, and acquire hyperspectral imaging data; a controlling and acquiring component, connected with the time delayer and the silicon-based camera, and configured to control the time delayer to adjust the time when the pump light reaches the silicon-based camera, receive the hyperspectral imaging data from the silicon-based camera, and acquiring an image of the target sample.

In some embodiments, the light source assembly includes: a high-power femtosecond laser, configured to generate a laser beam; a chirped periodically poled lithium niobate crystal, configured to separate the laser beam into the mid-infrared ultrashort pulse and the near-infrared ultrashort pulse; a collimator, configured to collimate the mid-infrared ultrashort pulse and the near-infrared ultrashort pulse; and a second dichroscope, configured to spatially separating the mid-infrared ultrashort pulse from the near-infrared ultrashort pulse to provide the pump light and the signal light, respectively.

In some embodiments, the collimator is a $CaF_2$ convex lens.

In some embodiments, the time-stretching component includes a dispersive medium, and the dispersive medium is configured to separate light components of different wavelengths in the signal light in the time domain.

In some embodiments, the dispersive medium is selected from a single-mode dispersive fiber, a multi-mode fiber, and a chirped fiber Bragg grating.

In some embodiments, the silicon-based camera is a silicon-based charge-coupled device.

In some embodiments, the silicon-based charge-coupled device is an electron multiplying charge-coupled device or an intensified charge-coupled device.

In some embodiments, the hyperspectral imaging apparatus further includes: a first plano-convex lens and a second plano-convex lens arranged in a light path between the target sample and the silicon-based camera. The target sample, the first plano-convex lens, the second plano-convex lens and the silicon-based camera constitute a 4f system, which is configured to transmit contour information and spectral information of the target sample to an image plane where the silicon-based camera is located. The first plano-convex lens and the second plano-convex lens are configured to zoom an imaging spot by adjusting a ratio of a focal length of the first plano-convex lens to that of the second plano-convex lens.

According to a third aspect of the present disclosure, there is provided a hyperspectral imaging device. The hyperspectral imaging device includes a processor; and a memory for storing instructions executable by the processor. The processor is configured to perform the hyperspectral imaging method as described in the first aspect of the present disclosure.

According to a fourth aspect of the present disclosure, there is provided a non-transitory computer-readable storage medium having stored therein instructions that, when executed by a processor of a terminal, causes the terminal to perform the hyperspectral imaging method as described in the first aspect of the present disclosure.

By taking advantage of the infrared imaging technology based on the non-degenerate two-photon absorption, a silicon-based imaging device with excellent performances can be used, thereby avoiding the limitations of traditional infrared focal plane array detectors in number of pixels, spatial resolution, frame rate and other aspects. In addition, in combination with the long wave pumping technology, background noises are further suppressed, and imaging sensitivity of the infrared signals is significantly improved.

The optical time-stretching technology breaks through the shortcomings of traditional spectroscopic methods. Through high time-resolved nonlinear optical sampling technology based on the ultrashort pulse, the spectral resolution can be improved to $10^{-4}$ nm, which is at least 3 to 4 orders of magnitude higher than traditional methods.

By controlling the time delay of the pump pulse for sampling, the desired wavelength range and analysis accuracy can be flexibly selected, and the hyperspectral imaging technology with non-uniform spectral sampling can be achieved, greatly reducing the acquisition time required for imaging on full spectrum effective information in practice.

In the following, the non-degenerate two-photon absorption technology will be illustrated with reference to FIG. 1.

Figure 1:
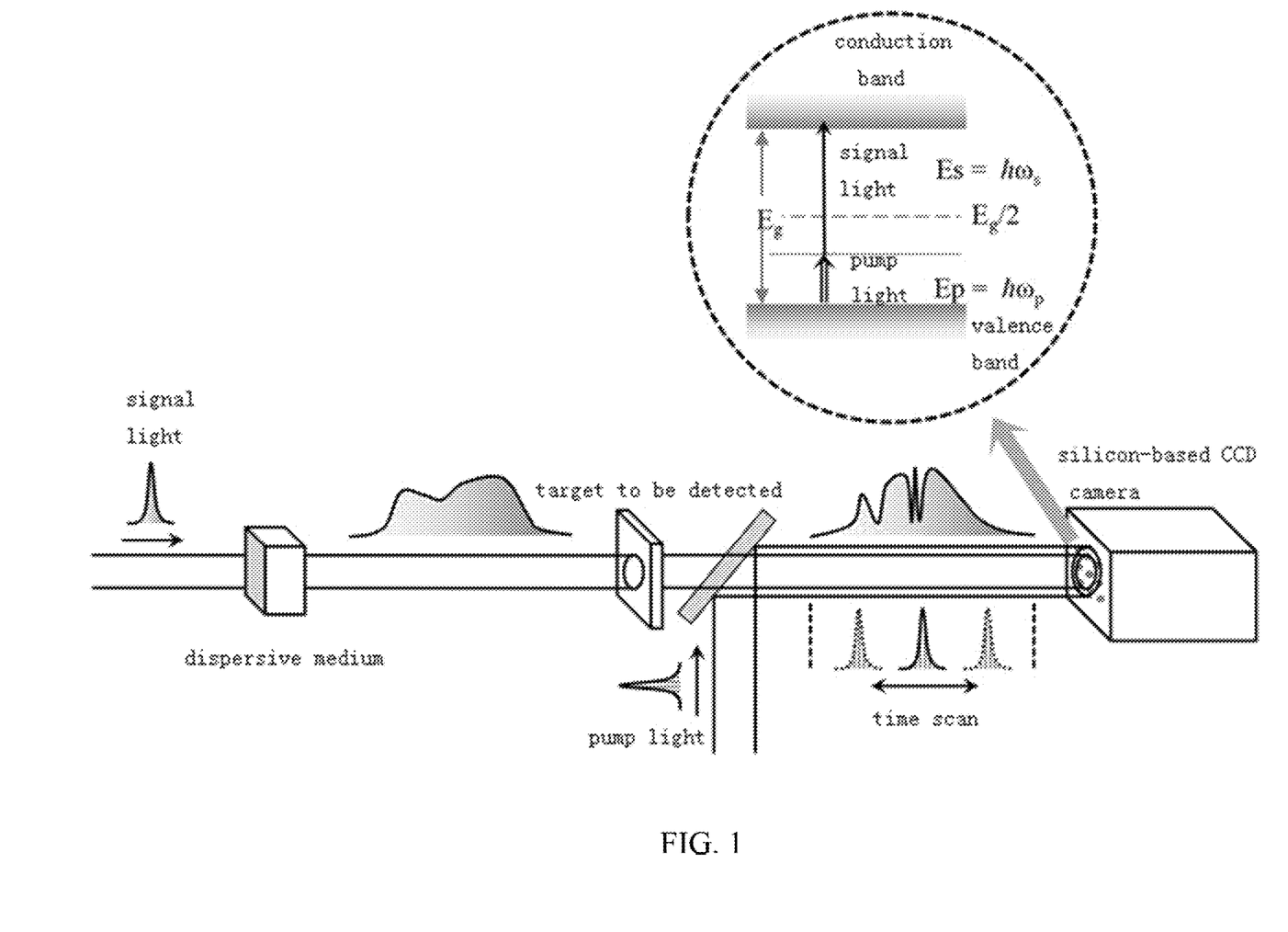
FIG. 1 is a schematic diagram showing a principle of a hyperspectral imaging method according to some examples of the present disclosure.

As shown in FIG. 1, a photon energy corresponding to the pump light is $E_p = \hbar\omega_p$, and a photon energy corresponding to the signal light is $E_S = \hbar\omega_S$. In the absence of the pump light, because $E_S < E_g$, so a silicon detector usually cannot respond to infrared bands greater than 1100 nm. By applying a suitable pump light field to make a sum of energies of the pump photon and the signal photon greater than the band gap energy $E_g$ of a silicon material, transition of electrons from a valence band to a conduction band can be realized by the process of non-degenerate two-photon absorption, thereby generating carriers. Compared with the detection using degenerate two-photon absorption of near-infrared signal light, non-degenerate two-photon absorption has a higher absorption coefficient.

In embodiments of the present disclosure, a mid-infrared long-wave pump light is adopted, and its photon energy is $E_p<E_g/2$, so noises caused by degenerate two-photon absorption of the pump light itself can be eliminated. Residual background noises mainly come from degenerate three-photon or four-photon absorption of the pump light, but the probability of occurrence of the degenerate three-photon or four-photon absorption of the pump light is reduced by orders of magnitude relative to the two-photon absorption, so the background noise caused thereby can be ignored even under a very high pump intensity.

In embodiments of the present disclosure, the signal light pulse can be efficiently detected by a detector through the non-degenerate two-photon absorption of a semiconductor material only under the action of the pump light pulse, that is, time-resolved imaging of the signal light is realized by taking advantage of the pump light pulse.

Further, the method according to embodiments of the present disclosure also combines an optical time-stretching technology to stretch the signal light in time domain, so that spectral information of the signal light reaching the detector at different times is different. In this way, the time-resolved imaging is achieved when realizing spectral-resolved imaging, finally realizing hyperspectral imaging based on time stretching.

The term optical time-stretching technology refers to a technology where an ultrafast pulse laser passes through a dispersive medium to separate lights of different wavelengths in the time domain, and spectral information of the pulse light can be deduced according to the difference of measurement time, so as to realize transformation from wavelength measurement to time measurement, which can greatly improve the spectral resolution. The spectral resolution $\delta\lambda$ is determined by a pulse width $\Delta t$ of the pump light, a total width $\Delta\lambda$ of the stretched spectrum of the signal light, and a period T of the stretched spectrum of the signal light during which the stretched spectrum of the signal light fills the entire pulse, i.e., $\delta\lambda=\Delta\lambda\Delta t/T$.

Figure 2:
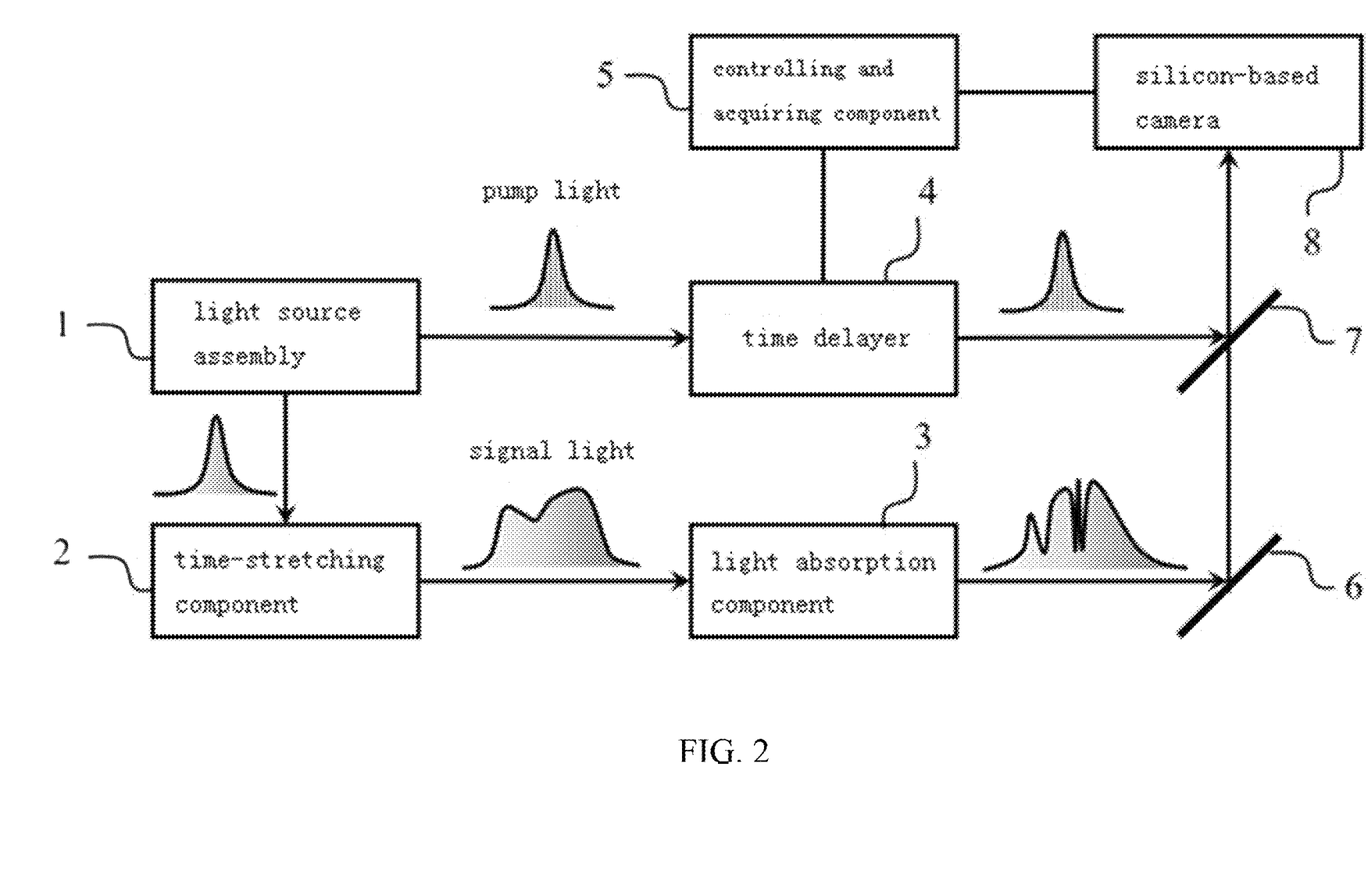
FIG. 2 is a schematic diagram showing a hyperspectral imaging apparatus according to some examples of the present disclosure.

FIG. 2 is a schematic diagram showing a hyperspectral imaging apparatus according to some examples of the present disclosure. The apparatus includes a light source assembly 1, a time-stretching component 2, a light absorption component 3, a time delayer 4, a controlling and acquiring component 5, a reflector 6, a first dichroscope 7, and a silicon-based camera 8.

Figure 3:
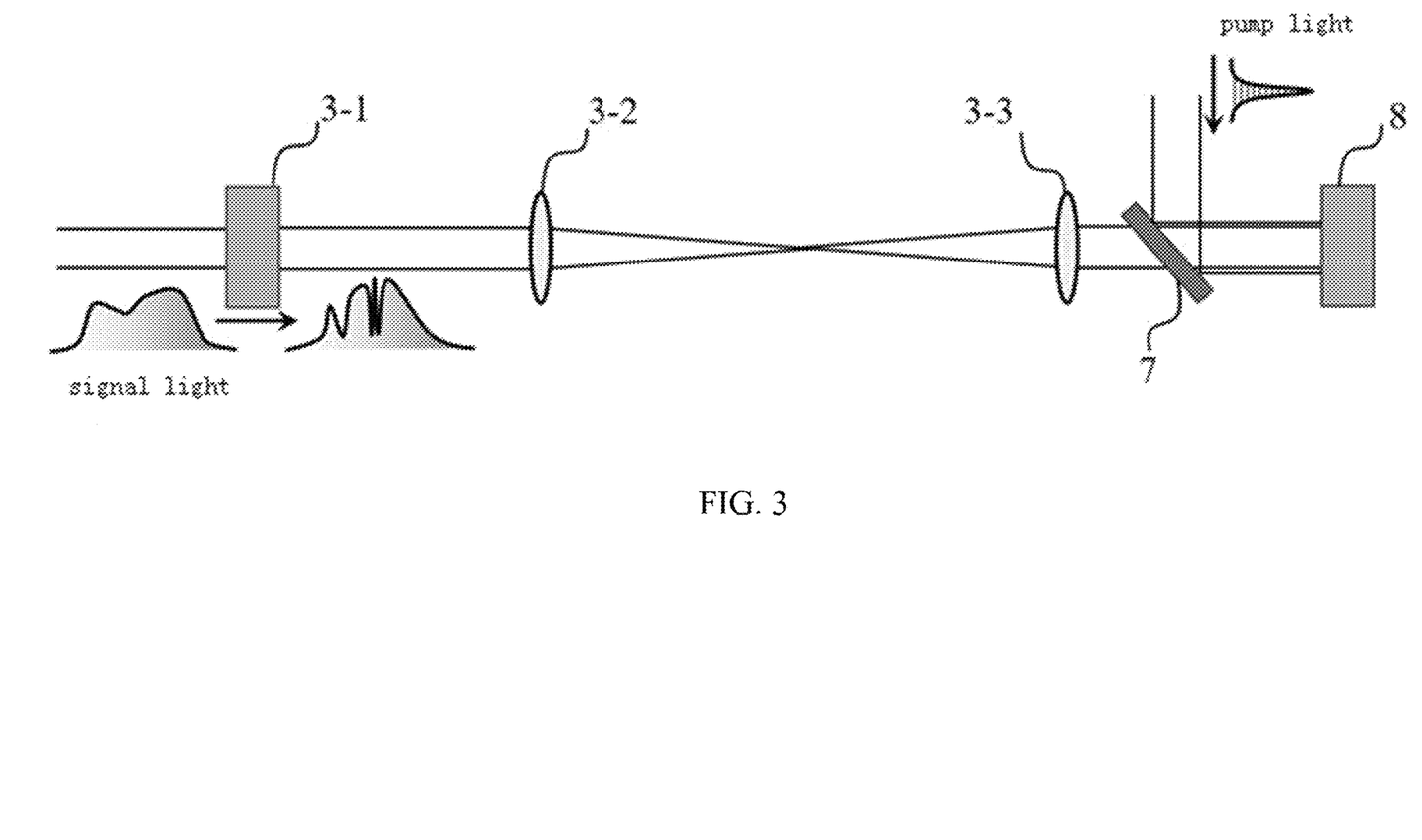
FIG. 3 is schematic diagram showing a 4f system according to some examples of the present disclosure.

As shown in FIG. 3, the light absorption component 3 includes a target sample 3-1, a first plano-convex lens 3-2 and a second plano-convex lens 3-3. The target sample 3-1, the first plano-convex lens 3-2, the second plano-convex lens 3-3, and the silicon-based camera 8 constitute a 4f system, which is used to transmit contour information and spectral information of the target sample 3-1 to an image plane where the silicon-based camera is located.

The light source assembly 1 according to embodiments of the present disclosure is configured to generate a mid-infrared ultrashort pulse and a near-infrared ultrashort pulseg, which are precisely synchronous in time domain and used as pump light and signal light, respectively. The bicolor synchronous light sources may be generated from a bicolor synchronous laser or may be achieved by a laser through nonlinear spontaneous parametric down-conversion. In some embodiments, the bicolor synchronous light sources are achieved through the nonlinear spontaneous parametric down-conversion due to its simpler structure.

In some examples, the signal light and pump light are generated by a high-power femtosecond laser through the spontaneous parametric down-conversion of a nonlinear process. In some examples, the high-power femtosecond laser has a central wavelength of 1030 nm, a repetition frequency of 20 MHz, a pulse width of 50 fs, an output power of 7 W, and a spectral width of 30 nm. The nonlinear crystal used is a chirped periodically poled lithium niobate (CPPLN) crystal with a polarization period ranging from 25.2 to 32 μm, which is placed in a temperature-controlled furnace, with the temperature set at 50° C. The generated signal pulse is of a central wavelength of 1550 nm and a spectral width of 70 nm, and the generated pump pulse is of a central wavelength of 3070 nm, a pulse width of about 50 fs, and a spectral width of 270 nm.

The time-stretching component 2 includes a dispersive medium, and is configured to separate lights of different wavelengths in time through the dispersive medium to realize wavelength-to-time conversion. The dispersive medium may be selected from a single-mode dispersive fiber, a multi-mode fiber, a chirped fiber Bragg grating, or the like.

In an example, a transmission fiber for a communication band is used due to its mature development and low transmission loss to the near-infrared band. In some examples, a 20 km dispersion-shifted fiber is used as the dispersive medium, which has a zero dispersion point of 1310 nm, and a larger positive dispersion at 1550 nm with a dispersion coefficient of 18 ps/(nm·km). The signal light may be stretched to about 25 ns through this fiber.

The light absorption component 3 includes a target sample to be detected, which may absorb light of a specific wavelength. After the time-stretched signal light passes through the target sample, desired spectrum absorption will be shown in the time-domain intensity distribution. The target sample may be detected in transmission mode or scattering mode. In an example, the transmission mode detection is used due to simple overall structure and high collection efficiency of the signal light.

The time delayer 4 is configured to adjust the time when the pump light reaches the silicon-based CCD. Since the signal light are time-stretched, light components reaching the silicon-based CCD at different times has different wavelengths. Therefore, by adjusting the time delayer, high-time-resolution pump light pulse gating can be achieved, so as to select different spectral components in the stretched signal pulse. In some examples, the time delayer may be realized by multiple turnbacks of the light beam in multiple cavities, and a mirror is installed on a long-range nano-motor, which can realize the precise control of the pulse delay.

The controlling and acquiring component 5 is configured to control the time delayer 4 and the silicon-based CCD camera to realize automatic acquisition of hyperspectral imaging data. Specifically, the controlling and acquiring component 5 is connected with the time delayer 4 and configured to control the time delayer 4 to adjust the time when the pump light reaches the silicon-based CCD. The controlling and acquiring component 5 is also connected with the silicon-based CCD camera to receive the hyperspectral imaging data from the silicon-based CCD and acquire an image of the target sample according to the hyperspectral imaging data.

The reflector 6 may be a gold plated mirror or a silver plated mirror, which has high reflectivity and low loss to the infrared band, and is used to change a direction of an optical path of the signal light. In an example, a silver plated mirror is used, which has a reflectivity of ≥98% in the spectral range of 1 to 20 μm.

The first dichroscope 7 is configured to spatially combine the signal light from the light absorption component and the pump light from the time delayer in such a way that a light spot formed by the pump light wraps a light spot formed by the signal light. In an example, a dichroscope with high reflectivity on lights ranging from 2.7 to 5 μm and high transmittance on lights ranging from 1300 to 1700 nm is used as the first dichroscope 7.

The silicon-based camera 8 is configured to detect the signal light. Specifically, the signal light is detected by the silicon-based camera 8 through the non-degenerate two-photon absorption on the semiconductor material under the action of the pump light. The silicon-based camera may be an electron multiplying CCD (EMCCD) or an intensified CCD (ICCD). In an example, a Si-EMCCD that has pixels of 1024×1280, a highest frame frequency of about 1 kfps and a single-photon sensitivity level is used to realize the sensitive detection and imaging of the infrared signal light.

Example 1

First, a high-power femtosecond laser is used to generate time-domain synchronous mid-infrared ultrashort pulse and near-infrared ultrashort pulses as pump light and signal light through nonlinear spontaneous parametric down-conversion. Specifically, a 1030 nm laser is focused onto a chirped periodically poled lithium niobate crystal through a convex lens with a focal length of 75 mm. By adjusting the temperature of the crystal to an appropriate value, the signal light with a central wavelength of 1550 nm and the pump light with a central wavelength of 3070 nm are generated, which are collimated by a $CaF_2$ convex lens that has a focal length of 75 mm and a high transmittance to the mid-infrared band, and then spatially separated through a second dichroscope, resulting in the time-domain synchronous signal light and pump light.

Then, the signal light is time-stretched by a 20 km single-mode communication transmission fiber as the dispersive medium to separate light components of different wavelengths in the signal light in the time domain. Spectral information of the signal light can be obtained by measuring the time-domain information of the signal light. The signal light then reaches the target sample 3-1 and its light component with a certain wavelength is absorbed by the target sample 3-1, and a depression of the time-domain signal envelope of the signal light corresponds to a spectral absorption peak of the target sample. The target sample 3-1, the first plano-convex lens 3-2, the second plano-convex lens 3-3, and the silicon-based camera 8 constitute a 4f system, which is used to transmit contour information and spectral information of the target sample 3-1 to an image plane where the silicon-based camera is located. In addition, by adjusting a ratio of a focal length of the first plano-convex lens 3-2 to that of the second plano-convex lens 3-3, an imaging spot may be the zoomed.

The silicon-based camera 8 cannot directly detect the infrared imaging signal. For this, the first dichroscope 7 is used to spatially combine the pump light and the signal light in such a way that a light spot formed by the pump light wraps a light spot formed by the signal light, and direct the combined light beam to the Si-EMCCD single-photon camera, where the sensitive detection of imaging signals is realized through the non-degenerate two-photon absorption on the silicon semiconductor material. At a time moment, the pump light only plays an enhanced detection effect on the long-wave pumping non-degenerate two-photon absorption of the signal light on a time scale of 50 fs. Because the signal light is time-stretched, and the spectrum is expanded in the time domain, the controlling and acquiring component 6 controls the time delayer 4 to adjust the pump pulse to perform nonlinear optical sampling on the imaging signals arriving at the Si-EMCCD single-photon camera at different times. The Si-EMCCD single-photon camera continuously collects imaging data to realize infrared hyperspectral imaging.

After the signal light is time-stretched, the pulse is expanded to 25 ns in the time domain, the width of the stretched spectrum is 70 nm, and the dispersion of the stretched spectrum is 2.8 nm/ns. The sampling accuracy of the pump light on the signal light is limited by the pulse width of the pump light itself, i.e., 50 fs. Therefore, according to the formula $\delta\lambda=\Delta\lambda\Delta t/T$, the spectral sampling accuracy can be calculated to be $1.4\times10^{-4}$ nm. If a sampling interval of the pump pulse is 50 fs, the total sampling number corresponding to the 25 ns signal light pulse is 0.5 M. The highest frame rate of a commercially available silicon-based camera is 1 M fps. That is, the hyperspectral data cube with a spectral resolution of $1.4\times10^{-4}$ nm can be obtained within 0.5 s using this silicon-based camera. If partial spectral resolution is sacrificed to make the total sampling number to be 1 k, that is, the sampling interval of the pump pulse is 50 ps, then the imaging rate is increased by 1000 times, and the collection of the hyperspectral data cube can be completed within 0.5 ms, and the spectral resolution at this time is 0.14 nm, which is still higher than the spectral resolution of the existing hyperspectral imager. If non-uniform spectral sampling (i.e., decreasing the sampling number for the spectral region of no interest) is adopted, the acquisition time required for full spectrum effective information can be greatly reduced in practice. In addition, the central wavelength of the pump light used in this example is 3070 nm. By selecting the pump wavelength greater than 3300 nm, the noise caused by the degenerate three-photon absorption introduced by its own strong pump field will be eliminated. Besides, increasing the pump power will further improve the sensitivity of infrared hyperspectral imaging to the single photon level.

Although explanatory embodiments have been shown and described, it would be appreciated by those skilled in the art that the above embodiments cannot be construed to limit the present disclosure, and changes, alternatives, modifications and variant can be made in the embodiments without departing from spirit, principles and scope of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments cannot be construed to limit the present disclosure, and changes, alternatives, modifications and variant can be made in the embodiments without departing from spirit, principles and scope of the present disclosure.

What is claimed is:

1. A hyperspectral imaging method, comprising:
providing a mid-infrared ultrashort pulse as pump light and a near-infrared ultrashort pulse as signal light, the mid-infrared ultrashort pulse and the near-infrared ultrashort pulse being synchronous precisely in time domain;
subjecting the signal light to optical time-stretching to broaden a pulse width of the signal light and separate light components of different wavelengths in the signal light in the time domain;
directing the time-stretched signal light to a target sample to be detected;
directing the pump light to a time delayer to adjust the time when the pump light reaches a silicon-based camera;
spatially combining the time-stretched signal light from the target sample with the pump light from the time delayer;
directing the combined light to a silicon-based camera where the signal light is detected through non-degenerate two-photon absorption of the signal light under the action of the pump light to acquire hyperspectral imaging data; and
obtaining an image of the target sample based on the hyperspectral imaging data.

2. The hyperspectral imaging method according to claim 1, wherein subjecting the signal light to optical time-stretching comprises:
passing the signal light through a dispersive medium to separate light components of different wavelengths in the signal light in the time domain.

3. The hyperspectral imaging method according to claim 2, wherein the dispersive medium is selected from a single-mode dispersive fiber, a multi-mode fiber, and a chirped fiber Bragg grating.

4. The hyperspectral imaging method according to claim 1, wherein the pump light and the signal light are provided by a laser through nonlinear spontaneous parametric down-conversion.

5. The hyperspectral imaging method according to claim 4, wherein the laser is a high-power femtosecond laser.

6. The hyperspectral imaging method according to claim 1, wherein providing the mid-infrared ultrashort pulse as the pump light and the near-infrared ultrashort pulse as the signal light comprises:
separating a laser beam generated by a laser to the mid-infrared ultrashort pulse and the near-infrared ultrashort pulse through a chirped periodically poled lithium niobate crystal;
collimating the mid-infrared ultrashort pulse and the near-infrared ultrashort pulse by a collimator, and
spatially separating the mid-infrared ultrashort pulse and the near-infrared ultrashort pulse by a dichroscope to provide the pump light and the signal light.

7. The hyperspectral imaging method according to claim 6, wherein the collimator is a $CaF_2$ convex lens.

8. The hyperspectral imaging method according to claim 1, wherein a photon energy corresponding to the signal light is lower than a band gap energy of a silicon material, a photon energy corresponding to the pump light is lower than a half of the band gap energy of the silicon material, and a sum of the photon energy corresponding to the signal light and the photon energy corresponding to the pump light is greater than the band gap energy.

9. The hyperspectral imaging method according to claim 1, wherein the silicon-based camera is a silicon-based charge-coupled device.

10. The hyperspectral imaging method according to claim 9, wherein the silicon-based charge-coupled device is an electron multiplying charge-coupled device or an intensified charge-coupled device.

11. A hyperspectral imaging apparatus, comprising:
a light source assembly, configured to provide a mid-infrared ultrashort pulse as pump light and a near-infrared ultrashort pulse as signal light, the mid-infrared ultrashort pulse and the near-infrared ultrashort pulse being synchronous precisely in time domain;
a time-stretching component, configured to subject the signal light to optical time-stretching to broaden a pulse width of the signal light and separate light components of different wavelengths in the signal light in the time domain;
a light absorption component, comprising a target sample, and configured to receive the time-stretched signal light and absorb a light component with a certain wavelength of the time-stretched signal light by the target sample;
a time delayer, configured to receive the pump light and adjust the time when the pump light reaches a silicon-based camera;
a first dichroscope, configured to spatially combine the signal light from the light absorption component and the pump light from the time delayer in such a way that a light spot formed by the pump light wraps a light spot formed by the signal light;
a silicon-based camera, configured to receive the combined light, detect the signal light through non-degenerate two-photon absorption of the signal light thereon under the action of the pump light, and acquire hyperspectral imaging data; and
a controlling and acquiring component, connected with the time delayer and the silicon-based camera, and configured to control the time delayer to adjust the time when the pump light reaches the silicon-based camera, receive the hyperspectral imaging data from the silicon-based camera, and acquiring an image of the target sample.

12. The hyperspectral imaging apparatus according to claim 11, wherein the light source assembly comprises:
a high-power femtosecond laser, configured to generate a laser beam;

a chirped periodically poled lithium niobate crystal, configured to separate the laser beam into the mid-infrared ultrashort pulse and the near-infrared ultrashort pulse;

a collimator, configured to collimate the mid-infrared ultrashort pulse and the near-infrared ultrashort pulse; and a second dichroscope, configured to spatially separating the mid-infrared ultrashort pulse from the near-infrared ultrashort pulse to provide the pump light and the signal light, respectively.

13. The hyperspectral imaging apparatus according to claim 12, wherein the collimator is a $CaF_2$ convex lens.

14. The hyperspectral imaging apparatus according to claim 11, wherein the time-stretching component comprises a dispersive medium, and the dispersive medium is configured to separate light components of different wavelengths in the signal light in the time domain.

15. The hyperspectral imaging apparatus according to claim 14, wherein the dispersive medium is selected from a single-mode dispersive fiber, a multi-mode fiber, and a chirped fiber Bragg grating.

16. The hyperspectral imaging apparatus according to claim 11, wherein the silicon-based camera is a silicon-based charge-coupled device.

17. The hyperspectral imaging apparatus according to claim 16, wherein the silicon-based charge-coupled device is an electron multiplying charge-coupled device or an intensified charge-coupled device.

18. The hyperspectral imaging apparatus according to claim 11, further comprising:

a first plano-convex lens and a second plano-convex lens arranged in a light path between the target sample and the silicon-based camera, wherein the target sample, the first plano-convex lens, the second plano-convex lens and the silicon-based camera constitute a 4f system, which is configured to transmit contour information and spectral information of the target sample to an image plane where the silicon-based camera is located; and the first plano-convex lens and the second plano-convex lens are configured to zoom an imaging spot by adjusting a ratio of a focal length of the first plano-convex lens to that of the second plano-convex lens.

19. A hyperspectral imaging device, comprising:

a processor; and a memory for storing instructions executable by the processor;

wherein the processor is configured to perform the hyperspectral imaging method according to claim 1.

20. A non-transitory computer-readable storage medium having stored therein instructions that, when executed by a processor of a terminal, causes the terminal to perform the hyperspectral imaging method according to claim 1.

* * * * *